Jan. 1, 1929.                                                                    1,697,823
C. H. SCHURR
MACHINE FOR FINISHING GEAR TEETH
Filed Jan. 10, 1927                       6 Sheets-Sheet 1

INVENTOR
Charles H. Schurr
BY Harry P. Canfield
ATTORNEY Jan. 1, 1929.  
C. H. SCHURR  
1,697,823  
MACHINE FOR FINISHING GEAR TEETH  
Filed Jan. 10, 1927  
6 Sheets-Sheet 2

INVENTOR  
Charles H. Schurr  
Harry P. Canfield  
ATTORNEY

Jan. 1, 1929.

C. H. SCHURR 1,697,823

MACHINE FOR FINISHING GEAR TEETH

Filed Jan. 10, 1927     6 Sheets-Sheet 4

INVENTOR.
Charles H. Schurr
BY Harry P Canfield
ATTORNEY.

Jan. 1, 1929.

C. H. SCHURR 1,697,823

MACHINE FOR FINISHING GEAR TEETH

Filed Jan. 10, 1927 6 Sheets-Sheet 5

INVENTOR.
Charles H. Schurr

BY 
ATTORNEY.

Patented Jan. 1, 1929.

1,697,823

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

MACHINE FOR FINISHING GEAR TEETH.

Application filed January 10, 1927. Serial No. 160,158.

This invention relates to machines for finishing gear teeth and the like, and particularly the working faces thereof.

The invention is particularly applicable to those methods of finishing gear teeth in which the gear to be finished, or the work gear, is run in mesh with another gear or gears, or with tools of gear form. In some of these well known methods, the work gear is burnished or polished. In others the work gear is lapped. Still other methods are employed, such for example as that disclosed in my Patent No. 1,642,179, Sept. 13, 1927.

The principal object of this invention is to provide an improved machine in which in general the finishing of gear teeth may be carried out.

Another object is to provide a machine by which the particular method of finishing gear teeth disclosed in my patent above referred to may be carried out in a preferred manner, and in which is embodied certain automatic features to facilitate rapid and accurate and safe production and ease of operation.

Another object is, to provide a machine in which the working pressure between the gearform tools and the work gear may easily be applied and controlled or regulated.

Other objects will be apparent to those skilled in the art.

The invention comprises among other things, means or a mechanism for causing the work gear to be operated upon by the tools to finish it; a mechanism for applying, regulating and controlling the working pressure between the tools and the work gear; a driving mechanism for applying power to rotate the work spindle upon which the work gear is mounted, and preferably a reversing mechanism to rotate it alternately in opposite directions; a driving mechanism for applying power to reciprocate the work spindle; a start and stop mechanism having automatic features; and the invention further consists in the novel construction, form, arrangement and combination of these elements by which their functions, fully described later, are carried out.

The invention is fully disclosed in the following description and in the accompanying drawings in which.

A brief description of the principal elements of my invention will first be given followed by a description in more detail.

Brief description.

The following description relates to the preferred use of my invention as applied to the gear finishing method of my Patent No. 1,642,179, Sept. 13, 1927.

At 1 is the work gear; at 27 the gear form tools. The work gear is rigidly mounted upon one end of a work spindle 3, upon the other end of which is rigidly mounted a small master gear 20. The gear form tools 27 are mounted respectively on the ends of tool spindles 29, upon the other ends of which are respectively mounted large master gears 28. The large and small master gears are preferably constantly in mesh and have face width great enough to permit considerable axial relative movement. The work spindle is adapted to be power rotated, preferably in alternate directions, by a gear 16 and to be power reciprocated by means of a rack 18 formed in a quill 5 within which the work spindle rotates. The rotating work spindle 3 transmitting its movement through the master gears 20 and 28 rotates the tool spindles 29 and causes the tools 27 to run in mesh with the work gear 1 in proper working relation thereto under control of the master gears 20 and 28 to effect the desired finishing operation. The reciprocation of the work spindle 3 moves the work gear 1 axially out of or into engagement with the tools 27, and while in engagement therewith, moves the work gear 1 axially sufficiently to enable the tools to work over the whole longitudinal length of the work gear teeth.

The tool spindles rotate within tool quills 36, which in turn are rotatable in the main frame about their axes of rotation 53, which are eccentric (as viewed in Figs. 1, 16 and 17) with respect to the axes of the tool spindles so that the tools 27—27 may be rocked away from the work gear to permit it to be removed and replaced with a new one, or rocked toward the work gear to engage its teeth and finish them. The axes of the tool spindles 29 are preferably slightly out of line with the axes of the work spindle 3 and the tool quills 36, and therefore when the quills 36 have been rotated in the direction to bring the tools 27 into working engagement with the work gear, further movement will set up a toggle action by which a predetermined pressure, or if desired, very great pressure may be applied upon the work gear by the tools. The tool quills 36 are arranged to be rocked or rotated by a hand lever 67.

Power is supplied to the machine through a drive shaft 109 having fast and loose pulleys 110 and 111. Through the agency of a pulley 108 on the drive shaft, straight and crossed belts 106 and 107, and reversing or belt shifting devices 137 and 138 therefor operated by a cam 150, the drive shaft 109 rotates an auxiliary shaft 103 in alternate directions, and the latter through gears 76, 75 and the gear 16, rotates the work spindle 3 in alternate directions. Through the agency of a worm gearing 113—114, change gears 116—117 and worm gearing 119—120, the driving power is transmitted from the drive shaft 109 to the cam 122 which actuates the rocking mechanism 127—131, the latter rocking the auxiliary shaft 132 and the gear 19 which reciprocates the rack 18 on the work quill 5. Similarly, power is transmitted through the worm gearing 151—152 to a cam 150 which periodically actuates the reversing or belt shifting devices 137—138. Automatic means is provided to shift the belt 112 and stop the machine at the end of a working cycle. The rocking mechanism 127—131 can be adjusted to vary both the extent or stroke of the reciprocatory movement of the work spindle and the point in the work cycle at which the reciprocation occurs. The cycle of operations may be further varied by varying the cams 122 and 150, but the preferred cycle is as follows.

Figure 13:
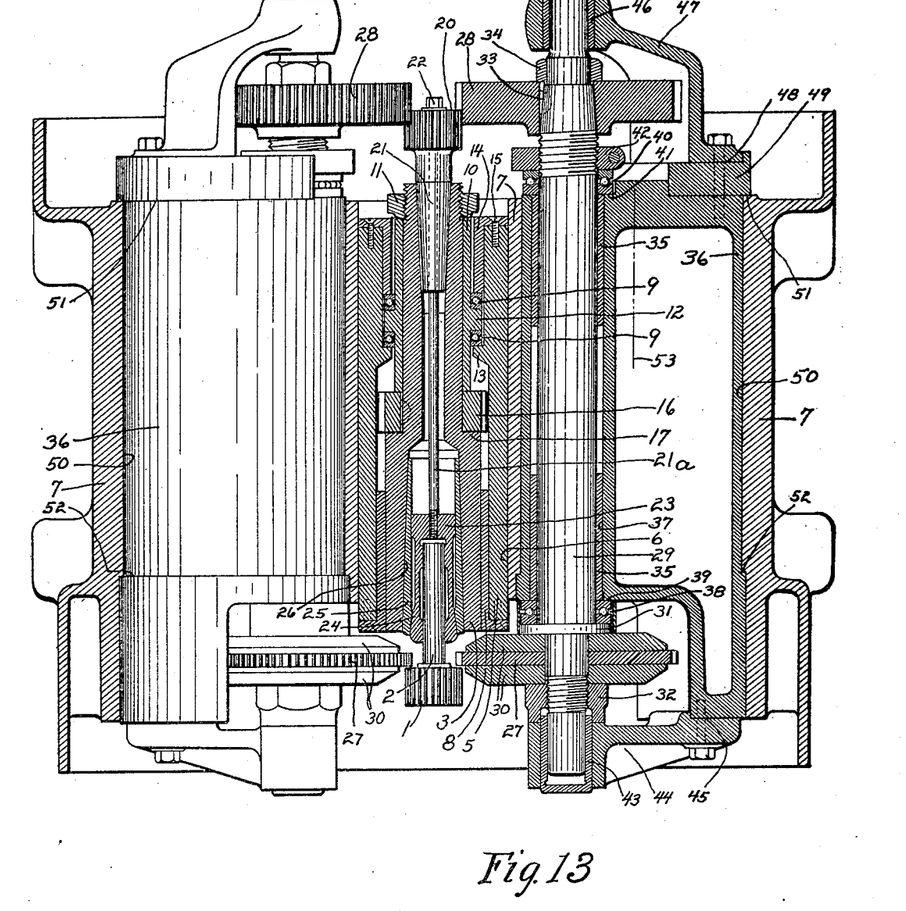
Fig. 13 is an enlarged sectional view of a part of the machine of Fig. 1 taken approximately from the plane 13—13 of Fig. 1.
Figure 14:
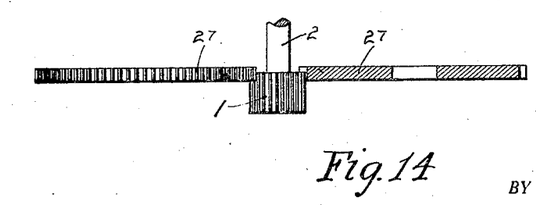
Fig. 14 is a view similar to Fig. 13 showing some of the parts only and in different positions.

With the machine at rest, a work gear 1 is placed loosely on the work spindle its position with respect to the tools 27 at this time being shown in Fig. 14, and the hand lever 67 is depressed to rock the work quills 36 about their axes and rock the tools 27 into mesh with the work gear 1. This locates the teeth of the work gear on the work spindle with respect to the teeth of the tools and it may then be rigidly secured thereon. The hand lever 154 is then moved (to the left in Fig. 1) to shift the power belt 112 to the fast pulley 110 to start the machine. The work gear thus begins to rotate and also moves forward towards the observer (as viewed in Figs. 14 and 13). When it has moved far enough to clear the tool gears 27, say to the position shown in Fig. 13, the hand lever 67 is depressed all of the way or to the maximum pressure position. Reciprocation of the work spindle 3 and work gear 1 in the rearward direction and rotation in the reverse direction now begins, and the finishing operation on the work gear begins. When the work gear has reached the end of its stroke rearwardly, the work spindle stops and reverses its direction to rotation and also begins its return reciprocatory movement, repeating the gear finishing operation in the reverse direction. When the work gear again reaches the position shown in Fig. 14, and while the gear teeth are still in engagement with the tools, the automatic stop mechanism is operated by the cam 158 and throws the belt 112 and stops the machine. This completes one cycle. The belt shifting stop mechanism may be tripped to stop the machine at any time during the cycle, by the pedal 198 and reset by the hand lever 154 to start up again.

The work gear may, if preferred, be located on the work spindle with respect to the teeth of the tools by another and different procedure to be described hereinafter and in accordance with which when the machine is once set up, the tools may remain thereafter in their set-up and adjusted positions, and need not again be moved by the hand lever 67 in the normal operation of the machine.

The invention will now be described in detail.

Gear-finishing mechanism.

Figure 15:
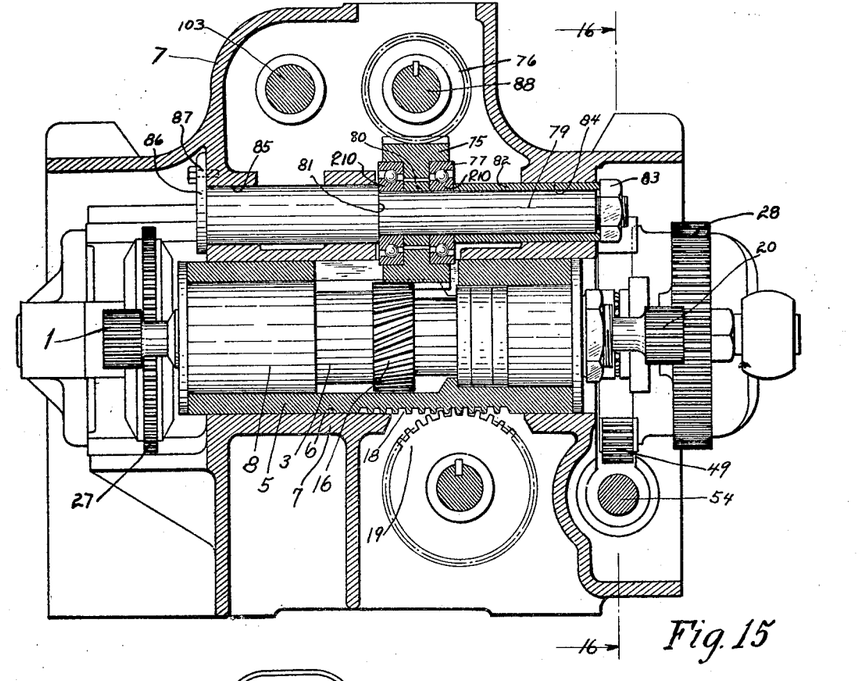
Fig. 15 is an enlarged sectional view taken approximately from the plane 15—15 of Fig. 1.

Referring to Figs. 13, 14 and 15, the gear to be finished, or work gear, 1, having in the case chosen for illustration a stem 2 is secured in or upon a rotatable work spindle 3 by a chuck or collet device to be described later. The work spindle 3 rotates within a radial bearing sleeve 8 carried in a work quill 5 mounted to be longitudinally reciprocable in a bore 6 in the main frame 7. The quill 5 has also end thrust ball bearings 9—9 to take the end thrust of the work spindle 3 in either axial direction. For transmitting the end thrust of the work spindle 3 to the work quill 5, the work spindle is provided with a thrust sleeve 10, rigidly secured upon it by a nut 11 and having a flange 12, on opposite faces of which the ball bearings 9—9 are placed; the work quill 5 is provided with a seat 13 and an internal sleeve 14, and the ball bearings are clamped between the seat 13 and the inner end of the sleeve 14 by screws 15. The work quill and the work spindle thus constitute a self-contained unit, the work spindle being rotatable within the quill, but held against longitudinal movement therein. The work spindle is adapted to be rotated within the quill by a helical gear 16, keyed to the work spindle, and clamped thereon between the inner end of the sleeve 10 and a shoulder 17 on the work spindle. Power is applied to the gear 16 by a gear 75 in a manner to be described later. On the lower side of the work quill 5 is formed a rack 18, meshing with which is a gear 19 by which power may be applied in a manner to be described later to reciprocate the work quill axially. In the end of the work spindle 3 opposite to the end carrying the work gear 1 is a small master gear 20 provided with a tapered shank 21 fitting into a corresponding tapered bore in the work spindle. To securely hold the work gear 1 and the small master gear 20 in or upon the work spindle 3, a bolt 21ᵃ having a head 22 passes axially through the master gear 20 and its shank 21 and on through the work spindle 3, its inner end being threaded into the body 23 of a collet. The collet has fingers 24, the outer surfaces of which engage the internal conical face of a ring or sleeve 25 in the usual manner of a collet. The sleeve 25 is tapered on its outer surface to fit a correspondingly tapered bore 26 in the work spindle so that the sleeve 25 fits rigidly in the work spindle. As will now be understood when the bolt head 22 is turned in one direction, the rod 21 will draw the collet head 23 inwardly and cause the collet fingers 24 to firmly grip the work gear stem 2, and rigidly secure the work gear in one end of the work spindle 3, and at the same time will securely seat the small master gear 20 in the other end of the work spindle. Upon turning the bolt head 22 in the other direction, the collet will release the work gear 1 and it may be removed and replaced with another without disturbing the master gear 20.

At 27—27 are a plurality of tools of gear form adapted to mesh with and work or finish the tooth surfaces of the work gear 1, and at 28—28 are a plurality of large master gears adapted to mesh with the small master gear 20. These tools 27 and master gears 28 are respectively secured rigidly on opposite ends of corresponding tool spindles 29, the arrangement being as follows. The relatively thin tool 27 is sandwiched between a pair of clamp plates 30—30, and the plates are clamped between a shoulder 31 on the tool spindle 29 and a nut 32 threaded on the tool spindle; the master gear 28 is taper-bored and keyed upon a tapered portion of the tool spindle 29 at 33, being held thereon by a nut 34. The tool spindle 29 is rotatably supported in radial sleeve bearings 35—35 carried in a tool quill 36 bored out at 37 to receive the bearings. These quills 36 will be more fully described later. An end thrust ball bearing 38 between the flange 31 on the tool spindle 29 and a shoulder 39 on the quill 36, and another end thrust ball bearing 40 between a shoulder 41 on the quill and an adjustable nut 42 on the tool spindle 29, serve to take up end thrust and end play of the tool spindle 29. An out-board bearing comprising a bearing sleeve 43 in a bracket 44 which is bolted to the tool quill 36 at 45, further supports the tool spindle at the end carrying the tool 27. Another outboard bearing comprising a bearing sleeve 46 in a bracket 47 which is bolted to the tool quill 36 at 48 through a gear segment 49 (to be described), further supports the tool spindle at the end carrying the master gear 28.

The tool quill 36 above referred to is, in general, of cylindrical form and is rotatably mounted in a cylindrical bore 50 in the main frame 7, and is held against longitudinal or axial movement therein by annular shoulders 51 and 52 on the quill engaging corresponding shoulders on the main frame 7. It will now be understood that the tool spindle 29 and the tool quill 36 constitute a self-contained unit capable of rotation about the axis 53 of the tool quill. The tool spindle 29 is at one side of the rotational axis 53 of the tool quill 36 and not co-axial therewith so that (see Figs. 1, 13, 16 and 17) when the tool quill 36 is rotated or rocked about its axis 53, the tool spindle 29 is rocked toward or from the work spindle above described, and consequently the tools 27 are rocked toward or from the work gear to bring the tools into or out of working engagement with the work gear. When the tools and work gear are in mutual engagement, the reciprocation of the work gear enables the tools to work over the whole length of its teeth. The width of the faces of the master gears 20 or 28 or both is such that they may be maintained in engagement during the reciprocation.

*Pressure applying mechanism.*

Figures 1, 2, 3:
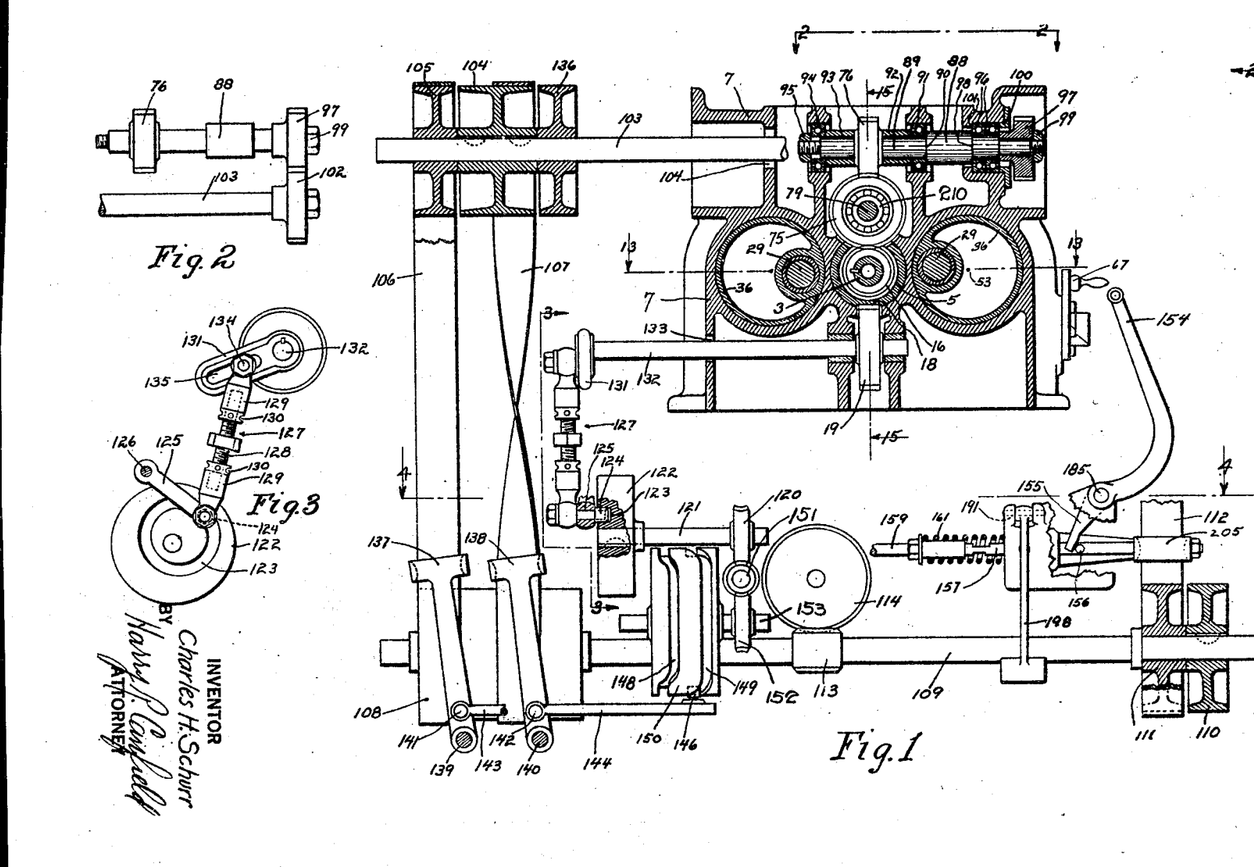
Fig. 1 is a front elevational view of a machine embodying my invention in which some of the parts are shown diagrammatically, some in section and some broken away and in which part of the main frame of the machine is omitted to simplify the drawing.
Fig. 2 is a partial plan view taken from the plane 2—2 of Fig. 1.
Fig. 3 is a partial side view taken from the plane 3—3 of Fig. 1.
Figure 16:
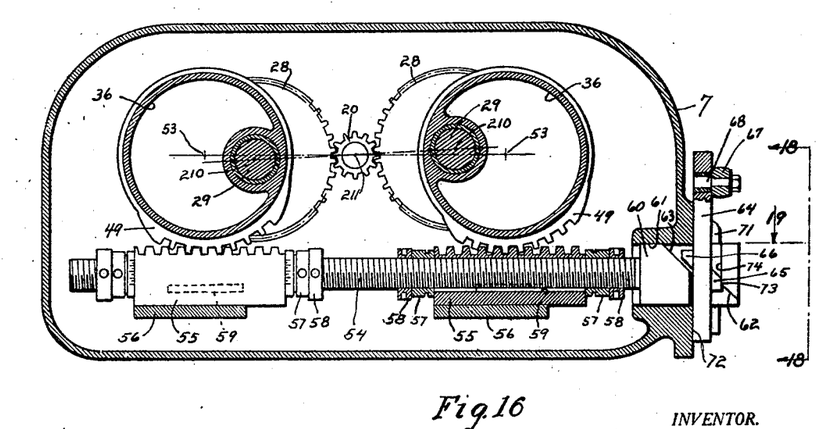
Fig. 16 is a partial sectional view taken approximately from the plane 16—16 of Fig. 15 and drawn to a slightly smaller scale.

In Figs. 1 and 16 the tool quills 36 and tool spindles 29 are shown approximately in the gear working or gear finishing positions, and it will be noted that the central axes 210 of the tool spindles 29 are slightly out of line with the axes 53 of the tool quills 36 and the axis 211 of the work spindle 3. With the parts in this position, if torque be applied to the tool quills 36 tending to rotate them in the direction (counter-clock-wise as viewed in Figs. 1 and 16) to bring the tool spindles more nearly in line with the tool quill axes, the teeth of the master gears 20 and 28 on one end of the spindles and the teeth of the tools 27 and work gear 1 on the other end of the spindles will be forced into very intimate contact with each other; and if the gear finishing process is one such as that described in my Patent No. 1,642,179, Sept. 13, 1927, in which the work gear teeth are larger than their finished size, the teeth of the tools 27 will engage the teeth on the work gear 1 with considerable pressure. Since the axes 210 of the tool spindles 29 are only slightly out of line with the axes 53 of the tool quills 36, relatively small turning torque on the quills may set up a toggle action producing very great pressures, which in some instances is highly desirable.

The means for applying torque to the tool quills 36 to provide working pressure between the tools 27 and work gear 1 will now be described. Each of the tool quills 36 is provided with a gear segment 49 rigidly secured thereto at 48. Immediately below each of the quills 36 (as viewed in Figs. 15, 16 and 17) is a threaded transverse rod 54 upon which are mounted rack members 55, the latter being in general of hollow cylindrical form and having on their upper surfaces rack teeth for engagement with the teeth of the gear segments 49. The rack members 55 are supported in cylindrical bearings 56 on the main frame, (see Figs. 15 and 16), and in turn support the bar 54 upon which they are adjustably mounted. By means of adjusting nuts 57 and lock nuts 58, the longitudinal positions of the rack members 55 on the bar 54 may be adjusted and fixed. To prevent the rack members 55 from turning in their bearings, but to permit them to have longitudinal movement therein, they are keyed to the rod 54 by keys 59, and the rod 54 in turn is held against rotation by a head 60 rectangular in section and mounted for longitudinal movement in a rectangular bearing 61 in the main frame 7. When the rod 54 is moved longitudinally by means to be described, say to the right as viewed in Figs. 16 and 17, the rack members 55 engaging the gear segments 29 will tend to turn the quills 36 in a counter-clock-wise direction and tend to bring the tool spindle axes 210 in line with the quill axes 53 as and for the purpose above described. When the rod 54 is moved toward the left, it and the associated parts will take up some position such as shown in Fig. 17, the tool quills 36 and tool spindles 29 being rocked in the clock-wise direction.

Figures 17, 18, 19:
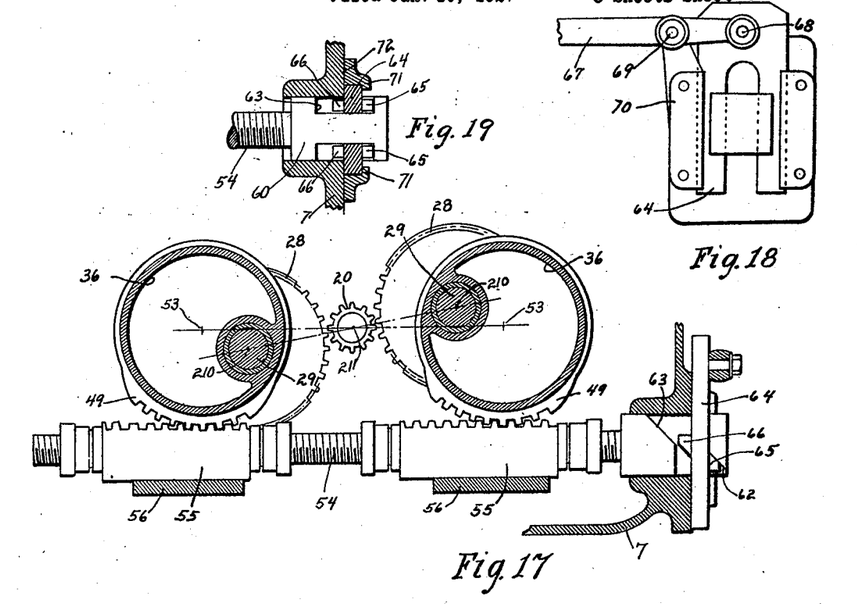
Fig. 17 is a view similar to Fig. 16 with some of the parts omitted or broken away and with the working parts moved to different positions.
Fig. 18 is a partial elevational view taken from the plane 18—18 of Fig. 16.
Fig. 19 is a partial sectional view taken approximately from the plane 19 of Fig. 16.

The views Figs. 16 and 17 are so taken as to show the relative positions which the master gears 28 take up with respect to the master gear 20 when the tool quills 36 are rocked. It will be understood that the tools 27 take up exactly similar corresponding positions relative to the work gear 1 at the same time and for this reason the latter have not been separately illustrated.

To move the rod 54 as described, I provide the following means. (See Figs. 16 to 19 inclusive.) The sides of the rectagular head 60 on the rod 54 are milled out to provide sloping cam surfaces 62 and 63. An inverted U shaped slide 64, having cams 65 and 66 on its opposite faces, straddles the milled-out portion of the head 60. A lever 67 pivotally connected to the slide 64 at 68 and fulcrumed at 69 upon a supporting bracket member 70, which in turn is secured to the main frame 7, (see Fig. 20) is provided to raise and lower the slide 64. When the slide 64 is lowered by lifting the lever 67, the cams 66 engage the cam surfaces 63 and propel the head 60, and therefore the rod 54 inwardly, that is, toward the left as viewed in Figs. 16 and 17, the resulting reaction on the slide 64 being taken up by the flanges 71 of the bracket member 70 which enclose the edges of the slide 64 as indicated in Fig. 16 and plainly shown in Figs. 18 and 19. When the lever 67 is depressed and the slide 64 is lifted, the cams 65 engage the cam surfaces 62 on the head 60 and propel the rod 54 outwardly to the right, as viewed in Figs. 16 and 17. It is this movement which may be used to apply great pressure to the work gear and therefore the relatively great resulting reaction on the slide 64 is taken by face 72 on the main frame, (Figs. 16 and 17) and by the vertical face 73 on the cam 65 engaging the vertical face 74 on the head 60. When the movement of the slide 64 has carried the cam 65 to the maximum pressure position such as shown in Fig. 16, over-travel of the slide 64 will not change the pressure, since the faces 73 and 74 are at right angles to the direction of the rod 54, and therefore the necessity of accuracy of movement of the lever 67 and its related parts, to repeatedly apply exactly the same pressure, is obviated. In this connection, the nuts 57 and lock nuts 58 may be employed to readjust the rack members 55 to compensate for wear, as well as to adjust for the desired amount of pressure. As will be described, the lever 67 may be operated to set the parts in the maximum pressure position such as shown in Fig. 16 at a time when the tools 27 are not in engagement with the work gear 1 and hence when there is no pressure exerted; thus wear on the parts effecting the pressure may be minimized.

In order that the pressure of one tool on the work gear may be counter-balanced by that of the other, to avoid or minimize lateral thrust on the work spindle, and also to permit duplication of structural parts, it is preferable that the tool quills and the tool spindles be symmetrically arranged with respect to the work spindle (when viewed as in Figs. 16 and 17). To this end it is preferable to have the axes 53 and 211 coplanar; and the axes 210 and 211 coplanar in all positions; and the radii 53—210 equal. But these coplanar and other relations are not intended to be embodied to a high degree of mathematical accuracy or symmetry, since the practical results will be obtained with only an approximation thereto as will be understood.

Rotating the work spindle.

As above described, the work spindle 3 carries a gear 16 for rotating it. This gear is driven by a helical gear 75, which, in turn, is driven by a helical gear 76, see Figs. 1 and 15. The gear 75 is mounted upon the outer races 77 of a pair of ball bearings, the inner races 210 of which are mounted upon a stationary shaft 79, and spaced apart by a spacer 80 and clamped against a shoulder 81 on the shaft by a sleeve 82 and a nut 83, the latter being threaded on the shaft. The shaft 79 is supported in the frame 7 in bores 84 and 85 therein, and is held against longitudinal movement by a flange 86 bolted to the frame 7 at 87.

The shaft 88 upon which the gear 76 is mounted has a reduced portion 89 providing a shoulder 90. Upon the reduced portion are successively assembled a ball bearing 91, a sleeve 92, the gear 76, a sleeve 93 and a ball bearing 94, all of which are rigidly held between the shoulder 90 and a nut 95 on the end of the reduced portion. The outer races of the bearings 91 and 94 are supported in suitable bores in the main frame 7. The other end of the shaft 88 has a reduced portion upon which are assembled double thrust ball bearings 96—96, and a change gear 97, held on the shaft against the shoulder 98 by a nut 99. The outer races of the bearings 96 have suitable supports in the main frame 7. The shaft assembly unit thus provided is held in the main frame against longitudinal movement by a collar 100 which clamps the outer races of the bearings 96 against a shoulder 101 in the main frame 7. The change gear 97 meshes with a mating change gear 102, mounted on one end of an auxiliary shaft 103, (see Fig. 2). Suitable bearings for the shaft 103 are provided but not shown, the shaft entering the main frame 7 at 104.

The auxiliary shaft 103 has a fast pulley 104 and two loose pulleys 105 and 136 thereon. These pulleys are connected in a manner and for a purpose to be described by means of a straight belt 106 and a crossed belt 107 to a driving pulley 108 mounted on a power shaft 109, which latter shaft in turn is provided with fast and loose pulleys 110 and 111 respectively for driving it, power being supplied by a belt 112 from any suitable power source. With the parts just described in the positions shown, the machine is at rest. When the belt 112 is shifted from the loose pulley 111 to the fast pulley 110 by a device to be described, power is transmitted through the cross belt 107 to the auxiliary shaft 103 and the other elements above described, including the gears 76, 75 and 16 to rotatively drive the work spindle 3, in one direction. Belt shifting means to be described is provided to function at a prescribed time during the cycle of operations to shift the belt 107 to the loose pulley 136, and the straight belt 106 to the fast pulley 104, to reverse the direction of rotation of the work spindle.

Reciprocating the work spindle.

To reciprocate the work spindle 3, I provide the following means. Power from the drive shaft 109, transmitted to and through the worm 113, worm wheel 114, shaft 115, change gear 116, mating change gear 117, shaft 118, worm 119, worm wheel 120, shaft 121, rotates the cam 122. The cam 122 is provided with a cam groove 123, (Fig. 3) in which travels a roller 124 mounted on one end of a link 125, the other end of which is pivotedly mounted on the main frame of the machine at 126. The roller 124 is thus constrained to move in an arcuate path substantially vertically. Pivoted to the free end of the link 125 is a connecting rod 127 constructed in the form of a turn-buckle by which its length may be adjusted, the right-and-left hand screw 128 being threaded into heads 129—129 and having lock nuts 130—130. The upper end of the link 127 is pivotedly connected at 134 to a crank 131 having an adjusting slot 135 and keyed to the end of an auxiliary shaft 132 which passes into the main frame 7 at 133 and carries on its inner end the gear 19 hereinbefore referred to. The inner end of the shaft 132 is supported in suitable bearings in the main frame 7 as shown in Fig. 1. The gear 19, as hereinbefore described, meshes with the rack teeth 18 on the lower side, (as viewed in Figs. 1 and 15) of the work quill 5. It will now be understood that as the cam 122 is rotated in one direction as above described, the connecting rod 127 and the crank 131 transmit to the gear 19 an oscillating movement which reciprocates the work quill 5 and spindle 3. By adjusting the length of the connecting rod 127, the zone within which the quill 5 and spindle 3 reciprocate may be shifted or adjusted relative to the housing 7 to adjust the relative longitudinal movement of the tools 27 with respect to the work gear 1. By adjusting the position of the pivotal connection 134 in the slot 135, the total length of stroke of the reciprocating work quill 5 and work spindle 3 may be varied or adjusted to adapt it to work gears of different longitudinal dimensions.

Reversing the work spindle.

As above mentioned, and for a reason to be described later, the direction of rotation of the work spindle 3 is reversed during a working cycle. I provide the following means for effecting this reversal. The auxiliary shaft 103 by which power is transmitted to rotate the work spindle 3, as above described, is provided with a fast pulley 104 and two loose pulleys 105 and 136 thereon. (See Fig. 1.) With the parts in the positions shown, the loose pulley 105 is connected by a straight belt 106 and the fast pulley 104 by a crossed belt 107 to the driving pulley 108 mounted on the power shaft 109. Two belt shifters 137 and 138 are provided for shifting the belts 106 and 107 respectively from the pulleys 105 and 104 to the pulleys 104 and 136 respectively, and subsequently back again to the position shown. As will be understood this serves to reverse the direction of rotation of the work spindle 3. Means is provided, as described below, to operate the gear shifters 137 and 138 in such manner that the belt which is on the fast pulley 104 is shifted somewhat in advance of the belt on the loose pulley in each case, (105 or 136), to facilitate reversal as will be understood. The belt shifters 137 and 138 are pivoted respectively at 139 and 140 on the main frame, and have pivotedly connected thereto, at 141 and 142, operating rods 143 and 144. These rods are constrained to have movement longitudinally only, by guides not shown, and their free ends terminate in rollers 145 and 146 respectively, arranged so as to travel in corresponding cam grooves 148 and 149 in a cam drum 150 which is rotated in one direction by power transmitted to it from the drive shaft 109 by way of the shaft 118, worm 151, worm wheel 152 and shaft 153. The drum 150 rotates so that, as viewed in Figs. 1 and 4, the visible part moves downwardly. Upon rotation therefore the cam groove 149 will move roller 146 and rod 144 toward the right in Figs. 1 and 4 and shift belt 107. After this shifting operation has started, but before it is completed, the cam groove 148 will move cam roller 145 to the right and similarly shift belt 106. When the drum 150 has turned half a revolution it repeats these shifting operations in the reverse order, that is, the shifting of the belt 106 is started in advance of the shifting of the belt 107.

Start and stop mechanism.

Means which will now be described is provided for automatically stopping the machine at the end of a working cycle; and by which it may be started manually at the beginning of the next working cycle or stopped and started again during a working cycle.

To shift the belt 112 (Figs. 1 and 4) to the fast pulley 110 to start the machine, the hand lever 154 pivoted at 185 to the main frame is rocked counter-clock-wise. This movement is transmitted to the fork 155 and thence by the trunnions 156—156 to the horiozntally arranged belt shifting bar 157, carrying the belt shifter fork 205, propelling it toward the right. The bar 157 is automatically locked in this position; and at the end of the working cycle it is automatically tripped by the cam 158 on the oscillating shaft 159, the mechanism for which will now be described.

Figure 4:
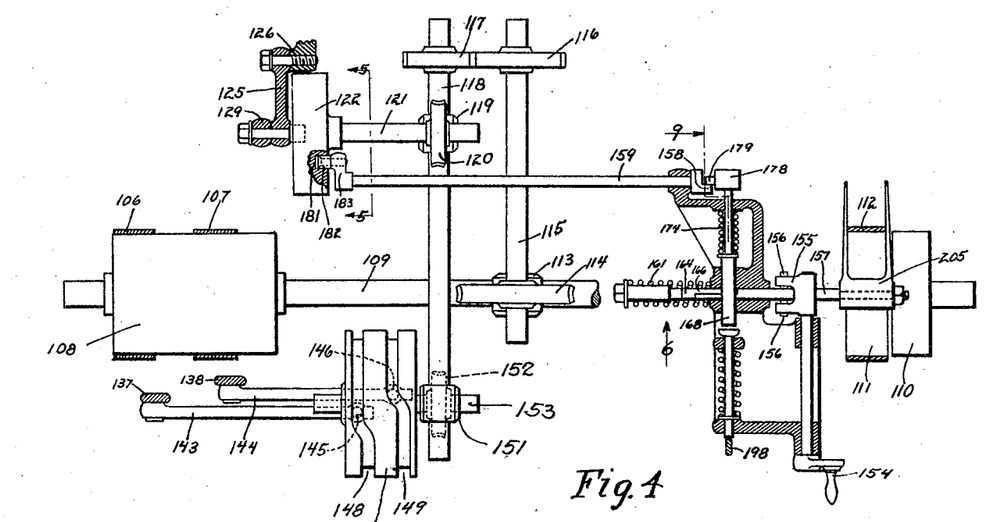
Fig. 4 is a sectional plan view taken from the plane 4—4 of Fig. 1, with some of the parts in section and some broken away.
Figure 6:
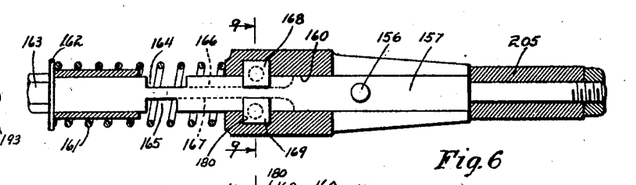
Figs. 6, 7 and 8 are enlarged sectional views of a part of a start and stop belt shifting feature shown in Fig. 1, these views respectively showing the operating parts in successively different positions.
Figure 7:
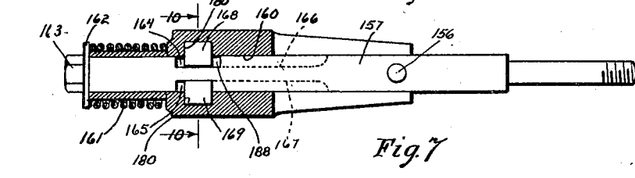
Figure 8:
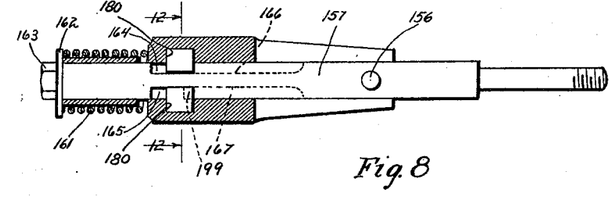
Figure 9:
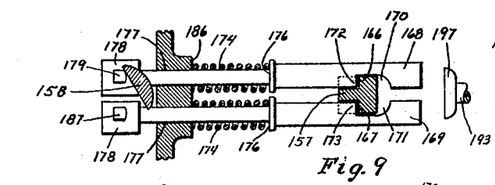
Figs. 9, 10, 11 and 12 are enlarged sectional elevational views of another part of the start and stop belt shifting feature, these views respectively showing the operating parts in successively different positions, and being taken from the planes 9—9, 10—10, and 12—12 of Figs. 6, 7 and 8 respectively.
Figures 20, 22:
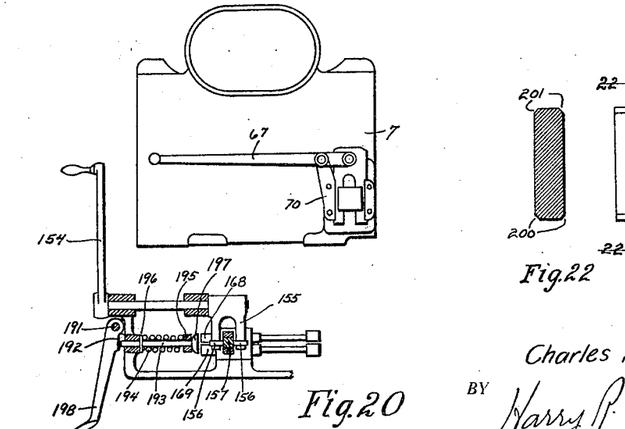
Fig. 20 is a simplified elevational view taken from the plane 20—20 of Fig. 1.
Fig. 22 is a partial sectional view taken from the plane 22—22 of Fig. 21.

Referring to Figs. 1, 4, 20 and particularly Figs. 6 to 12 inclusive, when the belt shifting bar 157 is moved to start the machine, it is moved from the position shown in Fig. 6 to that in Fig. 7. The movement is guided by a bearing 160 in the main housing or a supplemental housing attached thereto in any suitable manner. This movement compresses a spring 161 surrounding one end of the rod 157, and one end of which spring abuts upon the bearing 160 and the other end of which abuts against a washer 162 held upon the end of the rod 157 by a bolt 163. The rod 157 has two transverse notches 164 and 165 milled therein and two longitudinal grooves 166 and 167 milled in one side thereof, one end of the latter grooves opening into the notches 164 and 165. Upper and lower rectangular locking bolts 168 and 169 with recesses 170 and 171 in their adjacent faces are respectively provided, lying transversely with respect to the shifting bar 157, and on opposite sides thereof, and with the recesses 170 and 171 adapted to engage the above described grooves and notches in a manner to be described. The locking bolts 168 and 169 have respectively shoulders 172 and 173 formed by the recesses 170 and 171. Two compression springs 174, the ends of which abut respectively upon the frame at 186 and upon shoulders 176 on the locking bolts 168 and 169, resiliently hold the bolts 168 and 169 toward the right (as viewed in Figs. 9 to 12 inclusive). The locking bolts 168 and 169 pass through the main frame at 177—177 and terminate in heads 178—178 having lugs 179—187 thereon which are adapted to be engaged by the surface of the oscillating cam 158. Figs. 6 and 9 are corresponding views, and with the parts in these positions, (as shown also in Fig. 4) the shoulders 172 and 173 abut against the walls of the longitudinal grooves 166 and 167.

When the shifting bar 157 is moved from the position of Fig. 6 to that of Fig. 7, as above described, the grooves 164 and 165 are brought opposite the shoulders 172 and 173, and the locking bolt 169 is shot ahead (by its spring 174), and its shoulder 173 enters the notch 165. The shoulder 172 would likewise enter the notch 164, but is prevented therefrom by the engagement of the cam 158 with the projection 179 thereof and the parts therefore move from the position of Fig. 9 to that of Fig. 10. If the hand lever 154 (Fig. 1) is now released by the hand, the bar 157 tends to be retracted by the spring 161 but is prevented by the shoulder 173 in the notch 165. The bolt 169 is prevented from lateral movement which might at this time otherwise take place, by having a bearing surface 180 in the housing.

Figure 5:
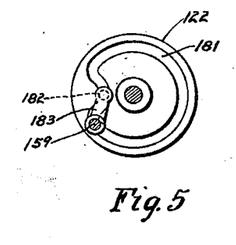
Fig. 5 is a partial sectional view taken from the plane 5—5 of Fig. 4.

The machine is now in motion and as described hereinbefore the cam 122, Figs. 1 and 4, is rotating. This cam besides having the cam groove 123 above described, has also in its opposite face a cam groove 181, see also Fig. 5, in which travels a roller 182 mounted on the end of an arm 183, which in turn is mounted on the end of the shaft 159. The cam groove 181 is so shaped, as shown in Fig. 5, that the roller 182 is moved to rock or oscillate the arm 183 and shaft 159 only once in a revolution of the cam 122 and the cam is so timed that this occurs at the end of the working cycle. As the end of the working cycle is reached, the cam 158 is in the position of Fig. 10 and is rocked from this position through the positions of Figs. 11 and 12 to the position of Fig. 9. In moving from the position of Fig. 10 to that of Fig. 11, the cam 158, by withdrawing from the projection 179, permits the locking bar 168 to move ahead, causing the shoulder 172 to enter the groove 164, and also the cam 158, by its engagement with the projection 187, retracts the locking bar 169. Fig. 1 corresponds to Fig. 11 as well as to Fig. 10 and it may be noted at this point that the notch 164 is wider than the notch 165 as measured longitudinally of the bar 157 providing a clearance space 188 (Fig. 7) for the shoulder 172. Continued movement of the cam 158 to the position of Fig. 12, retracts the locking bar 169 sufficiently to withdraw the shoulder 173 into the groove 167 so that the shoulder 173 no longer holds the bar 157, and the bar is retracted by its spring 161 until the clearance space 188 is closed up and the bar is stopped by the shoulder 172 in the notch 164. The parts are now in the positions shown in Figs. 12 and 8. The cam 158 has now reached the end of its oscillation in one direction and begins to oscillate in the other direction back to the final position of Fig. 9, during which time the locking bar 169 does not move ahead because the shoulder 173 engages or abuts against the wall of the groove 167 as at 199 Fig. 8, the two overlapping by the amount of the clearance 188 above mentioned as will be understood; but during this same time the cam, engaging the projection 179, retracts the locking bar 168, withdrawing the shoulder 172 until the parts reach the position of Fig. 9, whereupon the shoulder 172 releases the bar 157 and it is retracted by its spring 161 to the position of Fig. 6 which, as will be understood, moves the belt shifter fork 205 and shifts the belt 112 to the loose pulley 111. This stops the machine.

Figure 10:
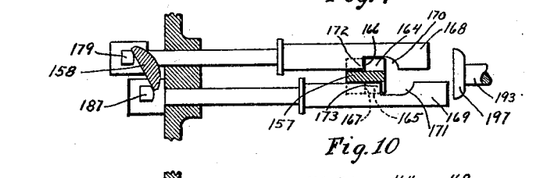
Figure 11:
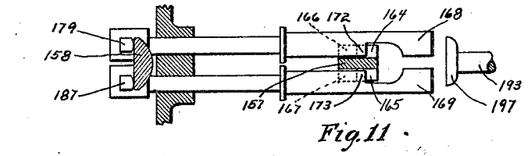
Figure 12:
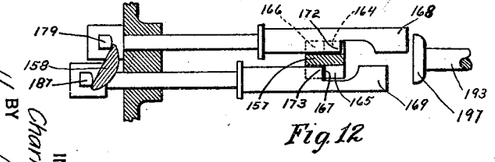

If, during the working cycle while the machine is running, with the parts above described in the positions of Figs. 10 and 7, or during the interval in which the parts are in the positions of Figs. 11, 12 and 8, it be desired to stop the machine for any reason, this may be done by depressing the pedal 198, Figs. 1 and 20. The pedal is pivoted at 191 to the main frame and depends therefrom so that when operated, a shoulder 192 thereon is given movement substantially horizontally as viewed in the drawings. This movement is transmitted to a plunger 193 to propel it longitudinally, the plunger being normally held in its retracted position by a spring 194, the ends of which abut upon the frame at 195 and upon a washer 196 on the plunger. The plunger terminates in a head 197 lying adjacent to the ends of the locking bolts 168 and 169. This head 197 is reproduced to a larger scale in Figs. 9 to 12 to show its operative relation to the locking bolts. It will now be understood that when the pedal 198 is depressed, the head 197 of the plunger 193 will be propelled forward, and whether the locking bolts are in the position shown in either Figs. 10, 11 or 12, either one or both of the locking bolts will be pushed back by the head 197 to the position shown in Fig. 9, which, as will be clear from the above description, will trip or release the bar 157 and stop the machine. If now it be desired to reset the bar 157 and restart the machine, after the pedal 198 is released and the head 197 is retracted by the spring 194, the hand lever 154 may again be rocked to actuate the belt shifting bar 157 and start up the machine as has been described.

Operation.

Figure 21:
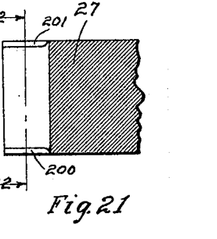
Fig. 21 is an enlarged view of a portion of one of the parts of Fig. 13.

As mentioned hereinbefore, my gear finishing machine may be employed to finish gears by a number of well known gear finishing methods. I will describe its operation however in connection with the method of my Patent No. 1,642,179, Sept. 13, 1927. In this case the teeth of the gear form tools 27 are chamfered along their edges as shown at 200 in Figs. 21 and 22, and preferably also on the other end of the teeth, as well, as shown at 201. Master gears 20 and 28 are placed upon the machine, chosen to have the same pitch diameters as the work gear 1 and the tools 27 respectively. The master gears and tool gears are very accurately made as to tooth profile, spacing, and concentricity in order that the tools 27 may accurately finish and correct the work gear teeth in correspondence therewith. Change gears 97—102 and 116—117 are selected to rotate respectively the work spindle 3 at the desired speed and to periodically reverse its rotation and its reciprocation at the desired rate. The tools 27 and the master gears 28 are rocked away from the work spindle, say to the position in Fig. 17, by raising the hand lever 67, (Figs. 18 and 20), to permit mounting the work gear 1 in place.

To mount the work gear 1, the bolt head 22, Fig 13, is turned to loosen the bolt 21$^a$ and collet fingers 24, and the stem 2 of the work gear is then inserted loosely within the collet fingers 24. Before tightening the collet, the tools 27 and master gears 28 are rocked toward the work spindle by lowering the lever 67 until the master gears 28 are intimately meshed with the master gear 20, as in Fig. 16 and the tools 27 with the work gear 1. This locates the work gear on the work spindle, and the collet may be tightened, to firmly grip the stem 2 of the work gear, by tightening the bolt head 22. I prefer to perform this setting-up operation when the work gear 1 and the tools 27 are axially related approximately as in Fig. 14; and this is made possible by properly positioning or adjusting the cam 158 or the arm 183 on the shaft 159 to cause the automatic stopping of the machine to occur when the work gear 1 and tools are in this position.

The machine is started up by rocking the lever 154 to the left, Fig. 1 as described above. The work spindle 3 begins to rotate in one direction and to reciprocate longitudinally forwardly (that is toward the observer as viewed in Fig. 13) to complete the reciprocatory stroke in that direction which was unfinished when the machine last stopped. When the work gear has thus moved until it is free from the tools 27, as illustrated in Figs. 13 and 15, the operator pushes the lever 67 all the way down, rocking the tool spindles 29 to their minimum distance from the work spindle 3, that is, to their working positions as shown in Fig. 16. The direction of rotation and of the reciprocatory movement of the work spindle 3 now both reverse, and the work gear 1 moves axially into engagement with the tools 27, and the chamfered ends 200 (Figs. 21 and 22) of the tool teeth begin to progressively work the faces of the work gear teeth.

If preferred, the work gear may be located on the work spindle so as to mesh properly with the tool, by the following procedure, instead of by that described above. The cam 158 or arm 183 may be adjusted to automatically stop the machine at a point in the reciprocatory stroke of the work spindle at which a new gear-to-be-worked when inserted in the collet fingers 24, will take up approximately the position illustrated in Figs. 13 and 15, but with the ends of the gear teeth engaging or abutting against the sloping faces of the chamfers 200. The collet may then be tightened and this will pull the longitudinal ends of the gear teeth firmly into the chamfered, generally wedge-shaped spaces between the tool teeth and will accurately position or center the gear in mesh with the tools. The machine may then be started and operated as described hereinbefore. With this procedure, the tools need not be rocked back and forth in the operation of the machine but only in initially setting up and adjusting the tools for the required position and pressure.

The pressure, which may be relatively great, between the tools 27 and the work gear 1, is substantially balanced on each side of the work gear by the symmetrical disposition of the tools with respect to the gear so that the tool spindle is subjected to very little radial load. When the work spindle and hence the work gear 1 has traveled axially to the full extent of its reciprocatory movement, its direction of rotation and of reciprocation both reverse; this is preferably timed to occur when the work gear has passed entirely free from the tools 27. On its return stroke the gear 1 is worked by the opposite set of chamfers 201 on the other ends of the tool teeth. The machine automatically stops when it reaches its starting position with the gear 1 and tools 27 again in the position of Fig. 14.

In Fig. 1 and particularly in Fig. 20, I have shown the relative positions of the levers 67, 154 and the pedal 198, and as will be seen, they are all grouped so as to be convenient to the right hand and foot of an operator when standing in front of the machine to operate it.

The machine may be employed to work gears of the same pitch over a considerable range of work gear diameters with the same tools 27 and master gears 28; it being necessary however to provide in each case a master gear 20 of suitable diameter and to adjust the rack members 55 on the rod 54 correspondingly.

In illustrating my invention, I have shown in the drawing a main frame 7 and only portions and fragments of the rest of the main frame, and have illustrated some of the parts of the mechanism in a somewhat diagrammatic manner to simplify the disclosure. In a number of places, shaft bearings and supports have been omitted, gear teeth have merely been indicated, etc., but such simplifications occur only in such individual elements of the machine as have heretofore been frequently employed, by those skilled in the art, in other machines in other arrangements and combinations and for other purposes, and it is believed that they will therefore be understood. Also it is believed that the manner of timing the operations above described by the cams and their associated parts 150, 158, 183, 122, 127, 135 will also be understood without further description.

If desired, the cycle of operations may be varied to finish a gear and stop the machine after one passage of the tools over the work gear instead of after the double passage above described; or the tools may be disengaged from the work gear after one passage thereover; or the tools may pass over the work gear any desired number of times. The tools may work the work gear on different pitch circles as described in my patent above referred to, or not as desired. Also a single tool 27 may be employed of desired. It may be desirable to employ only the chamfer 200 (and not 201 also) in which case the working stroke of the work gear may be stopped and reversed when the work gear leaves the chamfer and before the work gear has been carried free from the tools, to shorten the operating time.

Obviously, other modifications in the machine and its operation may be made without departing from the scope of my invention.

I claim:

1. In a machine of the class described, a first master gear, a work spindle adapted to support a work piece and the first master gear, a second master gear, a tool, a tool spindle adapted to support the tool and the second master gear, the two spindles having substantially parallel axes of rotation, and the tool spindle having also an axis of revolution substantially parallel to said axes, means for rotating the tool spindle about its axis of revolution to move it bodily toward and from the work spindle to engage and disengage the tool and work piece and the first and second master gears.

2. In a machine of the class described, a first master gear, a work spindle adapted to support a work piece and the first master gear, a second master gear, a tool, a tool spindle adapted to support the tool and the second master gear, the two spindles having substantially parallel axes of rotation, the tool spindle having also an axis of revolution substantially parallel to said axes, means for rotating the tool spindle about its axis of revolution to move it bodily toward and from the work spindle to engage and disengage the tool and work piece and the first and second master gears, means for rotating the spindles on their axes of rotation, and means for reciprocating one spindle longitudinally with respect to the other.

3. In a machine of the class described, a work spindle, a master gear thereon, mounting means thereon for loosely receiving and adapted to rigidly secure a work gear thereon, a tool spindle, a master gear thereon adapted to mesh with the said master gear on the work spindle, a gear form tool on the tool spindle the teeth of which are adapted to mesh with the teeth of the work gear, means for moving the tool spindle bodily toward the work spindle to mutually mesh the two said master gears and to mesh the tool with the work gear to position the work gear, and means for securing the work gear on the work spindle in said position.

4. In a machine of the class described, a work spindle, a master gear and a work gear thereon, a pair of bearing supports for the work spindle, a tool spindle, a master gear and a tool gear thereon, adapted to mesh respectively with the master gear and work gear of the work spindle, means for applying power to rotate the work spindle at a point between said bearing supports, means for reversing the direction of rotation, and means for applying power to reciprocate the work spindle at a point intermediate the work gear and master gear.

5. In a machine of the class described, a work quill adapted to be longitudinally reciprocated, a work spindle rotatably mounted in the work quill, a tool quill adapted to be rocked on an axis of revolution, a tool spindle rotatably mounted in the tool quill, means for rocking the tool quill to move the tool spindle toward and from the work spindle.

6. In a machine of the class described, a work spindle master gear, a work spindle adapted to support a work piece and the work spindle master gear, a plurality of tools, a plurality of tool spindle master gears, a plurality of tool spindles, each adapted to support a tool and a tool spindle master gear, the tool spindles and the work spindle having substantially parallel axes of rotation, the tool spindles each having also an axis of revolution substantially parallel to said axes, a single means for rotating the tool spindles about their axes of revolution to simultaneously move them bodily toward and from the work spindle to engage and disengage the tools with the work piece and the tool spindle master gears with the work spindle master gears.

7. In a machine of the class described, a work spindle adapted to support a work gear, a tool spindle, a tool on the tool spindle in general of gear form, the teeth of which are chamfered on their end surfaces, means for applying force tending to move the tool spindle bodily toward the work spindle to cause the teeth of the tool to mesh with the teeth of the work gear under pressure, means for setting up relative movement between the work spindle and the tool spindle axially, and means for rotating the tools and work spindles, to cause the tool to work all of the gear teeth and each tooth from end to end.

8. In a machine of the class described, a work spindle adapted to support a gear, a tool spindle adapted to support a tool in general of gear form, the tool spindle being mounted for movement bodily, whereby the tool may be moved into meshed engagement with the work gear under pressure, the tool teeth on both the longitudinal ends thereof being chamfered, means for rotating the spindles and means for setting up a reciprocatory movement of one spindle relatively to the other axially, whereby the tool may work all of the gear teeth around the gear and each tooth longitudinally from one end to the other and back again.

9. In a machine of the class described, a work spindle adapted to support a work gear, a tool for working the gear, means for rotating the gear and tool relatively to each other, whereby all of the teeth may be worked by the tool, means for giving the tool and gear reciprocatory movements relatively to each other axially with respect to the work gear, to cause the tool to work the gear teeth from end to end, automatic means adapted to be actuated by an operator to start the machine, and to stop it automatically at a predetermined point in one of said reciprocatory movements, and means for predetermining the number of said reciprocatory movements.

10. In a machine of the class described, a work spindle adapted to support a work gear, a tool for working the gear, means for rotating the gear and tool relatively to each other, whereby all of the teeth may be worked by the tool, means for giving the tool and gear reciprocatory movements relatively to each other axially with respect to the work gear, to cause the tool to work the gear teeth from end to end, automatic means adapted to be actuated by an operator to start the machine, and to stop it automatically at a predetermined point in one of said reciprocatory movements, means for predetermining the number of said reciprocatory movements, and means for reversing the direction of rotation of the work spindle at a predetermined point in one of the said reciprocatory movements.

11. In a machine of the class described, a work spindle adapted to support a work gear, a tool for working the gear, means for rotating the gear and tool relatively to each other, whereby all of the teeth may be worked by the tool, means for giving the tool and gear reciprocatory movements relatively to each other axially with respect to the work gear, to cause the tool to work the gear teeth from end to end, automatic means adapted to be actuated by an operator to start the machine and to stop it automatically at a predetermined point in one of said reciprocatory movements, means for predetermining the number of said reciprocatory movements, means for reversing the direction of rotation of the work spindle at a predetermined point in one of the said reciprocatory movements, operable means for actuating the automatic means to prematurely stop the machine, and for restarting the machine.

12. In a machine of the class described, a work spindle adapted to support a work gear, a tool in general of gear form meshing therewith, means for rotating the work spindle to cause the tool to work all of the gear teeth around the gear, means for setting up a relatively reciprocatory movement between the work gear and the tool in the direction axially of the work spindle, adjustable means for varying the length of the reciprocatory movement, and adjustable means for varying the relative axial positions of the tool and work gear at the end of a reciprocatory stroke.

13. In a machine of the class described, a work spindle adapted to support a work gear, a tool in general of gear form meshing therewith, means for setting up a relatively reciprocatory movement between the work gear and the tool in the direction axially of the work spindle, means for rotating the work spindle at such speed as to cause the tool to work the gear teeth around the gear more than one complete revolution for each reciprocatory stroke, adjustable means for varying the length of the reciprocatory movement and adjustable means for varying the relative axial positions of the tool and work gear at the end of a reciprocatory stroke.

14. In a machine of the class described, a belt shifter comprising a belt shifter rod, manual means for moving the belt shifter to a first position, means tending automatically to move the belt shifter to a second position, means for locking the belt shifter in the first position, said means comprising a locking bolt arranged transversely of the belt shifter rod and having a shoulder adapted to enter a notch in the rod, and means for retracting the locking bolt to withdraw the shoulder from the notch to release the belt shifting rod permitting it to move to the said second position.

15. In a machine of the class described, a work spindle adapted to support a work gear the teeth of which have been roughed-out slightly over-size, a tool spindle, a tool on the tool spindle in general of gear form and provided with working edges at the longitudinal termination of the curved tooth faces thereof, the tool and work spindles being relatively axially movable and being so spaced radially that relative axial movement thereof may bring the work gear teeth into meshed engagement with the tool teeth, and being also supported against relative radial movement so that the said engagement may be made under radial pressure, means for relatively rotating the said spindles and for moving the spindles relatively axially whereby the working edges of the tool teeth may enter the tooth spaces of the gear and progressively work the tooth faces thereof around the gear and longitudinally thereover.

16. In a machine of the class described, a work spindle adapted to support a work gear the teeth of which have been roughed-out slightly over-size, a tool spindle, a tool on the tool spindle in general of gear form and provided with working edges at the longitudinal termination of the curved tooth faces thereof, the tool and work spindles being relatively axially movable and being so spaced radially that relative axial movement thereof may bring the work gear teeth into meshed engagement with the tool teeth, and being also supported against relative radial movement so that the said engagement may be made under radial pressure, a master gear on the work spindle and a master gear on the tool spindle for causing the tool and work gear to rotate relatively in mesh with each other independently of their meshed relation, means for relatively rotating the said spindles and for moving the spindles relatively axially whereby the working edges of the tool teeth may enter the tooth spaces of the gear and progressively work the tooth faces thereof around the gear and longitudinally thereover.

17. In a machine of the class described, a work spindle adapted to support a work gear the teeth of which have been roughed-out slightly over-size, a plurality of tool spindles, a tool on each of the tool spindles in general of gear form and provided with working edges at the longitudinal termination of the curved tooth faces thereof, the work spindle and the tool spindles being relatively axially movable and the tool spindles being so spaced radially from the work spindle that said relative axial movement may bring the work gear teeth into meshed engagement with the teeth of the tools, and the tool spindles being also supported against movement radially with respect to the work spindle so that the said engagement will be made under radial pressure, and the tool spindles being symmetrically positioned about the work spindle whereby the tools mutually counter-balance their pressure on the work gear, means for relatively rotating the said spindles and for moving the tool spindles and the work spindle relatively axially whereby the working edges of the tool teeth may enter the tooth spaces of the gear and progressively work the tooth faces thereof around the gear and longitudinally thereover.

18. In a machine of the class described, a work spindle adapted to support a work gear the teeth of which have been roughed-out slightly over-size, a plurality of tool spindles a tool on each of the tool spindles in general of gear form and provided with working edges at the longitudinal termination of the curved tooth faces thereof, the work spindle and the tool spindles being relatively axially movable and the tool spindles being so spaced radially from the work spindle that said relative axial movement may bring the work gear teeth into meshed engagement with the teeth of the tools, and the tool spindles being also supported against movement radially with respect to the work spindle so that the said engagement will be made under radial pressure, and the tool spindles being symmetrically positioned about the work spindle whereby the tools mutually counter-balance their pressure on the work gear, a master gear on the work spindle and a master gear on each of the tool spindles meshed therewith for causing the tools and work gear to rotate relatively in mesh with each other independently of their meshed relation, means for relatively rotating the said spindles and for moving the tool spindles and the work spindle relatively axially whereby the working edges of the tool teeth may enter the tooth spaces of the gear and progressively work the tooth faces thereof around the gear and longitudinally thereover.

19. In a machine of the class described, a longitudinally reciprocable quill, a work spindle rotatably mounted in the quill and adapted to support a work gear, a rotatable tool spindle, a tool on the tool spindle in general of gear form and provided with working edges at the longitudinal termination of the curved tooth faces thereof, means for rotating the tool spindle, means for rotating the work spindle, and means for reciprocating the quill, whereby to bring the work gear teeth longitudinally into mesh with the tool teeth and to cause the said working edges of the tool to progressively work the gear teeth faces around the gear and longitudinally thereover.

20. In a machine of the class described, a longitudinally reciprocable quill, a work spindle rotatably mounted in the quill and adapted to support a work gear, a master gear on the work spindle, a tool spindle, a master gear and a tool in general of gear form on the tool spindle adapted to mesh respectively with the master gear and work gear on the work spindle, means for rotating the work and tool spindles with the master gears in mesh to cause the work gear and tool when in mesh to rotate independently of their meshed relation, and means for reciprocating the quill to cause the work gear teeth to move longitudinally into mesh with the tool teeth.

21. In a machine of the class described, a longitudinally reciprocable quill, a work spindle rotatably mounted in the quill and adapted to support a work gear, a master gear on the work spindle, a tool spindle, a master gear and a tool in general of gear form on the tool spindle adapted to mesh respectively with the master gear and work gear on the work spindle, means for applying power to the work spindle to rotate it, and, through the master gears, to rotate the tool spindle, to cause the work gear and tool when in mesh to rotate independently of their meshed relation, and means for applying power to the quill to reciprocate it to cause the work gear teeth to move longitudinally into mesh with the tool teeth.

22. In a machine of the class described, a rotatable work spindle adapted to support a work gear, a master gear on the work spindle, a rotatable tool spindle, a master gear and a tool in general of gear form on the tool spindle, means for moving the tool and work spindles relatively radially about an axis of revolution to bring the master gears into mutual engagement, means for moving the tool and work spindle relatively longitudinally to move the work gear teeth and tool teeth relatively longitudinally into mutual meshed engagement, means for rotating the tool and work spindles.

23. In a machine of the class described, a longitudinally reciprocable and rotatable work spindle adapted to support a work gear, a master gear on the work spindle, a rotatable tool spindle adapted to be rocked about an axis of revolution, a master gear and a tool in general of gear form on the tool spindle, means for rocking the tool spindle bodily toward the work spindle to bring the master gears into mutual meshed engagement, means for rotating the tool spindles and means for longitudinally moving the work spindle to move the work gear teeth longitudinally into mesh with the tool teeth.

24. In a machine of the class described, a longitudinally reciprocable work quill, a work spindle rotatably mounted in the work quill and adapted to support a work gear, a master gear on the work spindle, a tool spindle, a master gear and a tool in general of gear form on the tool spindle, means for moving the tool spindle bodily toward the work spindle to bring the teeth of the master gears into mutual meshed engagement, means for rotating the work and tool spindles and means for reciprocating the work quill to move the work gear teeth longitudinally into mesh with the tool teeth.

25. In a machine of the class described, a longitudinally reciprocable work quill, a work spindle rotatably mounted in the work quill and adapted to support a work gear, a master gear on the work spindle, a tool quill adapted to be rocked on an axis of revolution, a tool spindle rotatably mounted in the tool quill, a master gear and a tool in general of gear form on the tool spindle, means for rocking the tool quill to move the tool spindle toward the work spindle to bring the teeth of the master gears into mutual meshed engagement, means for rotating the work and tool spindles, and means for reciprocating the work quill to move the work gear teeth longitudinally into mesh with the tool teeth.

26. In a machine of the class described, a longitudinally reciprocable work quill, a work spindle rotatably mounted in the work quill and adapted to support a work gear, a work master gear on the work spindle, a plurality of tool quills each adapted to be rocked on an axis of revolution, a tool spindle rotatably mounted in each of the tool quills, a tool master gear and a tool in general of gear form on each of the tool spindles, means for rocking the tool quills to move the tool spindles toward the work spindle to bring the teeth of the work master gear and tool master gears into mutual meshed engagement, means for rotating the work and tool spindles, means for reciprocating the work quill to move the work gear teeth longitudinally into mesh with the teeth of all of the tools, the tool spindles in their rocked positions being supported against radial movement with respect to the work spindle so that the engagement of the work gear and tools may be under radial pressure, and the tool spindles being symmetrically positioned about the work spindle whereby the tools mutually counter-balance their pressure on the work gear.

27. In a machine of the class described, a longitudinal reciprocable work quill, a work spindle rotatably mounted in the work quill and adapted to support a work gear the teeth of which have been roughed-out slightly oversize, a work master gear on the work spindle, a plurality of tool quills each adapted to be rocked on an axis of revolution, a tool spindle rotatably mounted in each tool quill, a tool master gear and a tool in general of gear form on each of the tool spindles, the teeth of the tools being provided with working edges at the longitudinal termination of the curved tooth faces thereof, means for rocking the tool quills to move the tool spindles toward the work spindle to bring the teeth of the work master gear and tool master gears into mutual meshed engagement, means for rigidly supporting the tool quills in their rocked positions to hold the tool spindles against movement radially with respect to the work spindle so that the said engagement of the work gear teeth and tool teeth may be under pressure, and the tool spindles being symmetrically positioned about the work spindle whereby the tools mutually counter-balance their pressure on the work gear, means for reciprocating the work quill to move the work gear teeth longitudinally into mesh with the tool teeth whereby the working edges may enter the tooth spaces of the work gear and progressively work the tooth faces thereof around the gear and longitudinally thereover.

28. In a machine of the class described, a work spindle, a pair of tool quills having axes of oscillation, a tool spindle supported by each quill and on diametrically opposite sides of the work spindle, means for oscillating the quills to move the tool spindles toward or from the work spindle, the movement of each quill corresponding to that of the other to cause the axes of the tool spindles to be, in all positions thereof, coplanar with the work spindle axis.

29. In a machine of the class described, a work spindle, a pair of tool quills having axes of oscillation on diametrically opposite sides of the work spindle and coplanar with the axis thereof, a tool spindle supported by each quill and on diametrically opposite sides of the work spindle, means for oscillating the quills to move the tool spindles toward or from the work spindle, and the movement of each quill corresponding to that of the other to cause the axes of the tool spindles, to be, in all positions thereof, coplanar with the axis of the work spindle.

30. In a machine of the class described, a work spindle; a pair of tool quills having axes of oscillation on opposite sides of the work spindle, coplanar with the axis thereof and equidistant therefrom; a tool spindle supported by each quill, at opposite sides of the work spindle and with each tool spindle axis equidistant from its quill axis of oscillation; and means for oscillating the quills to move the tool spindles toward or from the work spindle, the movement of the quills being equal to cause the axes of the tool spindles to be, in all positions thereof, coplanar with the work spindle axis and equidistant therefrom.

31. In a machine of the class described, a work spindle; a pair of tool quills having axes of oscillation on opposite sides of the work spindle, and in a common plane with the axis thereof, and equidistant therefrom; a tool spindle supported by each quill, or opposite sides of the work spindle, with the tool spindle axes on opposite sides of the common plane and with each tool spindle axis equidistant from its quill axis of oscillation; and means for oscillating the quills to move the tool spindles toward or from the work spindle and the tool spindle axes toward and from the common plane, the movement of the quills being equal to cause the axes of the tool spindles to be, in all positions thereof, coplanar with the work spindle axis and equidistant therefrom.

32. In a machine of the class described having a cycle of operations, a belt shifter comprising a belt shifting rod, manual means for moving the belt shifter to a first position to start the machine, means tending automatically to move the belt shifter to a second position to stop the machine, means for locking the belt shifter in the first position comprising a locking bolt arranged transversely of the belt shifter rod and having locking means engaging corresponding locking means on the rod to prevent the movement thereof, and automatic means operable by the machine for retracting the locking bolt to disengage said locking means to release the belt shifting rod and permit it to move to the second position at a predetermined point in the cycle of operation of the machine, and alternative manual means for retracting the lock and bolt.

33. In a machine of the class described, a work spindle, a tool spindle, a tool on the tool spindle in general of gear form, means on the work spindle whereby a work gear may be mounted thereon and rotatably adjusted thereon to align its teeth with the teeth spaces of the gear form tool suitably for meshing therewith, means for then securing the work gear rigidly on the work spindle in adjusted position, means for relatively rotating the work and tool spindles and for relatively moving the work and tool spindles longitudinally, to bring the work gear teeth and tool teeth into mesh and to cause the tool teeth to work the gear teeth progressively around the gear and longitudinally thereover.

34. In a machine of the class described, a work spindle, a tool spindle, a tool on the tool spindle in general of gear form, means on the work spindle whereby a work gear may be mounted thereon and rotatably adjusted thereon to align its teeth with the teeth spaces of the gear form tool suitably for meshing therewith, means for then securing the work gear rigidly on the work spindle in adjusted position, means for relatively rotating the work and tool spindles and for relatively moving the work and tool spindles longitudinally, to bring the work gear teeth and tool teeth into mesh and to cause the tool teeth to work the gear teeth progressively around the gear and longitudinally thereover, and a master gear on the work spindle and a master gear on the tool spindle meshing therewith to cause the tool teeth to mesh with the gear teeth independently of their own meshed relation.

35. In a machine of the class described a reciprocatory quill, a rotary spindle in the quill, rack teeth on the quill, a gear meshed with the rack teeth and adapted to be oscillated to longitudinally reciprocate the quill and spindle, a gear on the spindle, an intermediate gear meshed therewith and adapted to be rotated to rotate the spindle in the quill during reciprocation thereof, and means for rotating the intermediate gear.

36. In a machine of the class described a reciprocatory quill, a rotary spindle in the quill, rack teeth on the quill, a gear meshed with the rack teeth and adapted to be oscillated to longitudinally reciprocate the quill and spindle, a gear on the spindle, an intermediate gear meshed therewith and adapted to be rotated to rotate the spindle in the quill during reciprocation thereof, and means for rotating the intermediate gear, said means comprising a driving gear meshed with the intermediate gear and connected through change gears to a source of power.

37. In a machine of the class described a pair of quills mounted for rotation on parallel rotational axes, a spindle in each quill mounted for rotation therein on axes parallel to the quill axes, means for simultaneously oscillating the quills to bodily rock the spindles about the quill axes respectively, said means comprising a segment of gear teeth on each of the quills, rack teeth meshed with the teeth of each gear segment and means for moving the rack teeth longitudinally.

38. In a machine of the class described a pair of quills mounted for rotation on parallel rotational axes, a spindle in each quill mounted therein for rotation on axes parallel to the quill axes, the quills being normally rotatively positioned so that the axes of the spindles lie generally between the axes of the quills, means for simultaneously rotating the quills in opposite directions of rotation about their axes to correspondingly rock the spindles to move the spindle axes toward or from the plane of the quill axes, said means comprising gear teeth on the quills and rack teeth meshed therewith and means for moving the rack teeth, the rack teeth and gear teeth being so arranged that when one quill is rotated clockwise the other is rotated counter-clockwise.

39. In a machine of the class described a pair of quills mounted for rotation on parallel axes of rotation, a spindle in each quill mounted therein for rotation on rotational axes parallel to the quill axes, the quills being normally rotatively positioned so that the spindle axes lie generally between the quill axes, means for simultaneously rotating the quills in opposite directions to simultaneously move the spindle axes toward or from the plane of the quill axes, said means comprising segmental gear teeth on each of the quills, a pair of racks meshed respectively with the gear segments and means for simultaneously moving the racks longitudinally, and means for adjustably moving one of the spindles independently of the other spindle comprising means for adjustably moving one of the racks longitudinally independently of the other rack.

40. In a machine of the class described, a work spindle, a tool spindle, a tool on the tool spindle in general of gear form and provided with working edges at the longitudinal termination of the tooth faces, means whereby a work gear having roughed-out oversize teeth may be positioned on the work spindle with its teeth aligned longitudinally with the teeth spaces of the gear form tool suitably for being meshed therewith, means for securing the work gear rigidly on the work spindle in said position, means for relatively moving the work and tool spindles longitudinally and for relatively rotating the work and tool spindles to bring the tool teeth into mesh with the gear teeth under pressure and to cause the tool teeth by means of the working edges thereof to work the gear teeth around the gear and progressively longitudinally thereover.

41. In a machine of the class described, a work spindle, a tool spindle, a tool on the tool spindle in general of gear form and provided with working edges at the longitudinal termination of the tooth faces, means whereby a work gear having roughed-out oversize teeth may be positioned on the work spindle with its teeth aligned longitudinally with the teeth spaces of the gear form tool suitably for being meshed therewith, means for securing the work gear rigidly on the work spindle in said position, means for relatively moving the work and tool spindles longitudinally and for relatively rotating the work and tool spindles to bring the tool teeth into mesh with the gear teeth under pressure and to cause the tool teeth by means of the working edges thereof to work the gear teeth around the gear and progressively longitudinally thereover, and a master gear on the work spindle and a master gear on the tool spindle adapted to be meshed with each other to cause the tool teeth to run in mesh with the gear teeth independently of their own meshed relation.

In testimony whereof, I have hereunto signed my name.

CHARLES H. SCHURR.